C. C. MOREY.
FILING TOOL.
APPLICATION FILED JULY 6, 1918.
1,337,940. Patented Apr. 20, 1920.
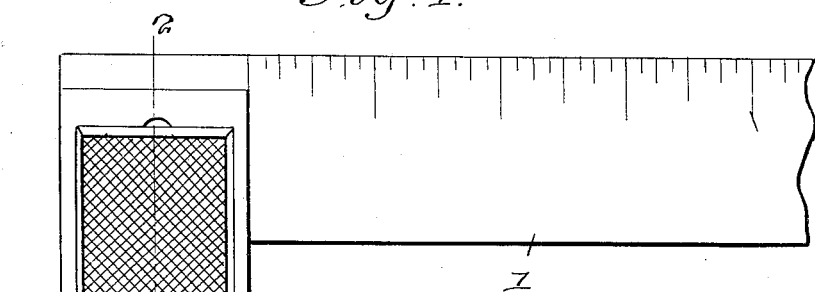
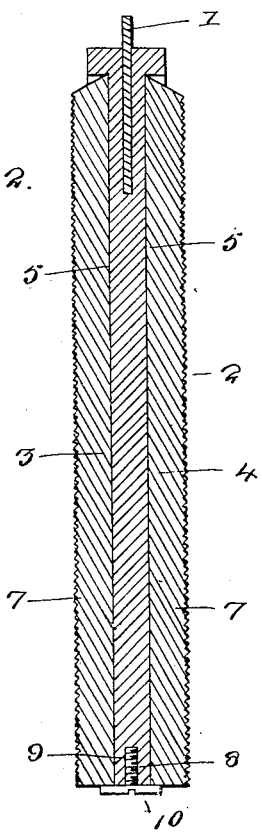
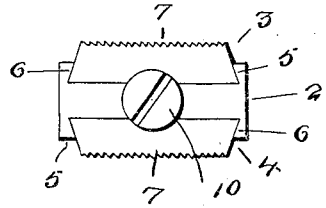
Witnesses
Everett L. Lloyd Jr.
Inventor
C. C. Morey
By Victor J. Evans
Attorney

UNITED STATES PATENT OFFICE.

CHARLES C. MOREY, OF GREAT FALLS, MONTANA.

FILING-TOOL.

1,337,940. Specification of Letters Patent. Patented Apr. 20, 1920.

Application filed July 6, 1918. Serial No. 243,539.

*To all whom it may concern:*

Be it known that I, CHARLES C. MOREY, a citizen of the United States, residing at Great Falls, in the county of Cascade and State of Montana, have invented new and useful Improvements in Filing-Tools, of which the following is a specification.

The object of my present sole invention is the provision of a filing tool in which two files are strongly though removably secured in a handle in such manner that either file may be used to advantage.

To the attainment of the foregoing, the invention consists in the improvement as hereinafter described and claimed.

In the accompanying drawings, hereby made a part hereof:

Figure 1 is a plan view showing my novel tool as forming part of a try square.

Fig. 2 is a transverse section on the line 2—2 of Fig. 1, and

Fig. 3 is an end view showing the means for removably holding the files in place.

The try-square comprises the usual blade 1, secured in a handle portion 2, which latter, aside from the details hereinafter noted, may be of any desired construction.

For the purposes of the present invention, the sides 3 and 4 of the handle, that is, those surfaces parallel to the blade 1, are each formed with longitudinally extending recesses 5, which may be of any desired width and open through the free end of the handle.

The walls of the recesses are undercut, as at 6, and wood rasps or files 7, of size and shape to fit the recesses, are removably arranged therein. The coöperating edges of the files and the undercut walls 6 of the recesses permit sliding movement of the files relatively to the handle, so that the files may be readily removed or endwise reversed in an obvious manner.

It will be observed that the outer ends of the files 7 are square. The inner ends of said files are, however, beveled as shown in Fig. 2, so as to permit of the ready interposition of a prying displacing instrument between the inner ends of the files and the inner square end walls of the recesses 5. From this it follows that the files may be expeditiously and easily removed from the recesses 5 to be reversed or to be replaced with new files.

The free end of the handle is formed with a threaded socket 8, to receive the shank of a screw-bolt 9, the enlarged head 10 of which overlies the ends of the files and holds them against endwise movement.

If desired, and as preferred, the files 7 are of different finenesses of filing surface, to thereby provide the obvious advantage of two different files.

The use of the improvement is plain. The try-square proper will serve as a handle in using the files, and either file will be readily available at any time, without the necessity of handling a separate tool for the purpose.

Having thus described the invention, what is claimed as new is:—

A filing tool comprising a handle having in its sides longitudinal recesses which extend to and are open at one end of the handle and are provided with undercut side walls and square inner end walls, files of greater thickness than the depth of said recesses, removably arranged in the recesses and having beveled inner ends and also having square outer ends, arranged flush with the end of the handle, and a screw having a shank socketed in said end of the handle and also having a head bearing against said end and the outer square ends of the files.

In testimony whereof I affix my signature.

CHARLES C. MOREY.